Figures 1, 2:
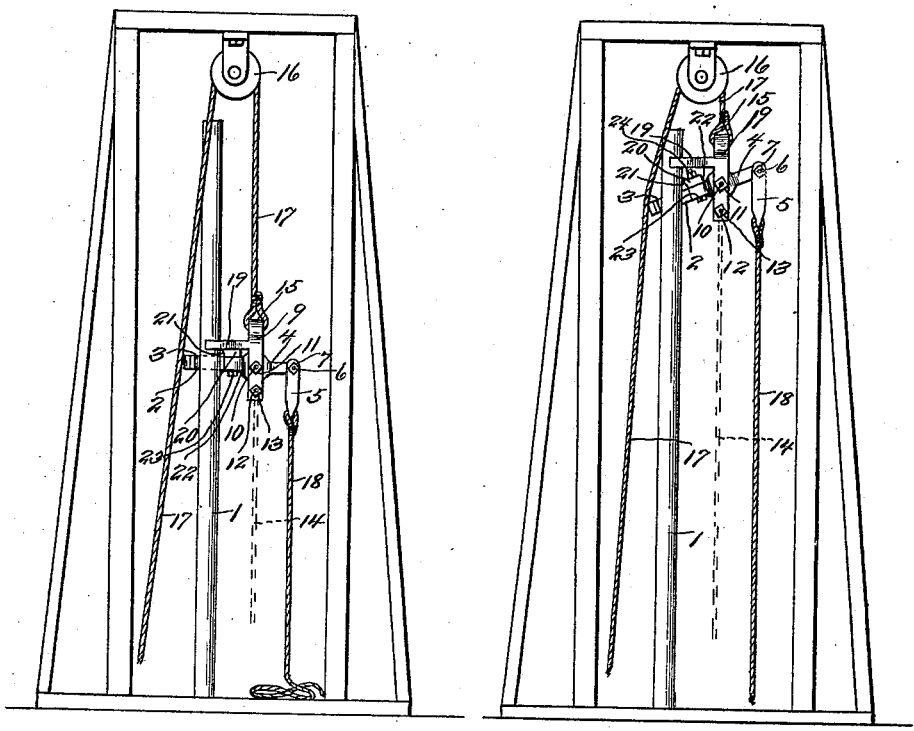

F. J. LILAK.
PIPE HOOK.
APPLICATION FILED APR. 10, 1911.

996,655.

Patented July 4, 1911.

2 SHEETS—SHEET 1.

Witnesses
Francis G. Boswell
L. Dunn

Inventor
Frank J. Lilak
By D. Swift & Co.
Attorneys

F. J. LILAK.
PIPE HOOK.
APPLICATION FILED APR. 10, 1911.
996,655.
Patented July 4, 1911.
2 SHEETS—SHEET 2.
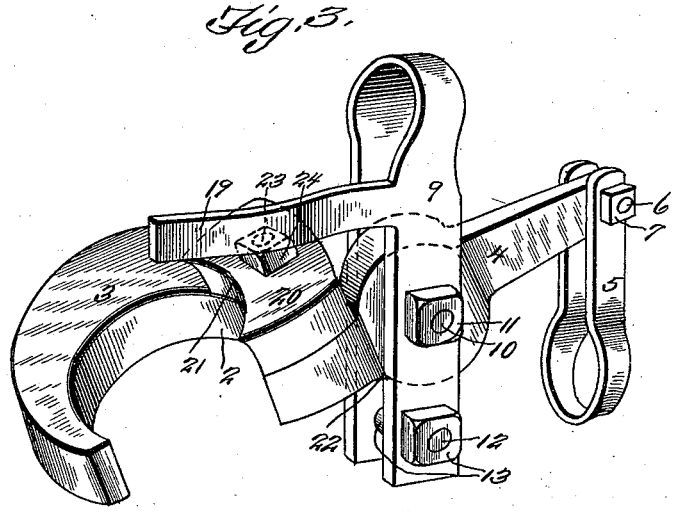
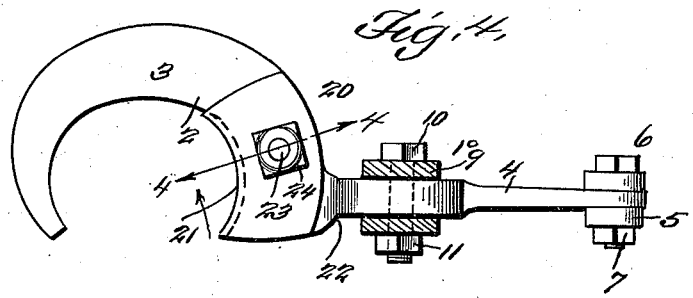
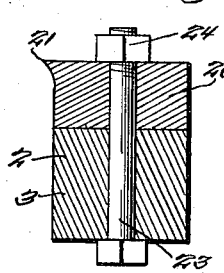
Witnesses
Inventor
Frank J. Lilak,
By D. Swift & Co.
Attorneys

UNITED STATES PATENT OFFICE.

FRANK J. LILAK, OF WILSON, KANSAS.

PIPE-HOOK.

996,655.  Specification of Letters Patent.  Patented July 4, 1911.

Application filed April 10, 1911. Serial No. 620,104.

*To all whom it may concern:*

Be it known that I, FRANK J. LILAK, a citizen of the United States, residing at Wilson, in the county of Ellsworth and State of Kansas, have invented a new and useful Pipe-Hook; and I do hereby declare the following to be a full, clear, and exact description of the invention, such as will enable others skilled in the art to which it appertains to make and use the same.

This invention pertains to a new and useful pipe hook adapted for lowering or extracting pipes and the like into and out of wells.

The primary object of the invention is to provide a device of this design which is simple, efficient and practical in construction. In the drawings, however, there is only disclosed one form of the present invention, but in practical fields this form may require alterations, to which the applicant is entitled, provided the alterations are comprehended by the appended claims.

The invention comprises further features and combinations of parts, as hereinafter set forth, shown in the drawings and claimed.

In the drawings:—Figure 1 is a view in side elevation, showing the application of the improved pipe hook, the same being constructed in accordance with the invention. Fig. 2 is a view similar to Fig. 1, showing the pipe hook at its uppermost position on the pipe, which is ready to be lowered into the well. Fig. 3 is an enlarged detail perspective view of the hook removed from the pipe. Fig. 4 is a plan view of the pipe hook partly in section. Fig. 5 is a sectional view taken on line 4—4 of Fig. 4.

Referring more especially to the accompanying drawings, 1 designates the pipe to be lowered into the well, while 2 denotes the hook as a whole. This hook 2 is provided with a substantially semi-circular ring 3, which forms the body of the hook, and into which the pipe to be lowered extends. Projecting laterally of the ring is a shank 4, to the extreme end of which a loop 5 is pivoted, by means of a bolt and nut 6 and 7. Also pivoted upon the shank substantially midway of its extreme end and the ring is an additional loop 9. A bolt 10 extends through the ears of the loop 9 and the shank 4, on the end of which bolt nut 11 is applied. By virtue of the bolt 10 and nut 11, the loop 9 is pivoted to the shank. An additional bolt 12 passes through the extreme ends of the loop 9, and is provided with a nut 13. This bolt and nut 12 and 13 constitute means for strengthening the loop. A rope 14, as shown in dotted lines, may be attached to the bolt 12, in order to steady the pipe hook as it is being elevated or hoisted on the pipe, by means of the rope 17. The rope 17 is secured to the loop 9, as shown at 15, and passes over the pulley 16, which is suspended above the well. When it is desired to hoist the pipe hook, so as to dispose it at the upper end of the pipe, as shown in Fig. 2, a pulling action is imparted on the rope 17. As the pipe hook is being hoisted, a slight pulling action is imparted on the rope 18 (which is secured to the loop 5), so as to steady the pipe hook, and, furthermore, to hold the same substantially horizontal, as the hook is being hoisted along the pipe. After the pipe hook has been hoisted to the upper end of the pipe, the rope 18 is released, thus permitting the pipe hook to assume the position as shown in dotted lines in Fig. 2, after which the rope 17 is gradually released, thus allowing the pipe to be gradually lowered into the well. Projecting laterally of the loop 9 is an arm 19, which prevents the hook from disengaging the pipe, while the hook is being hoisted thereon.

From the foregoing, it will be observed that there has been devised a novel, practical pipe hook, adapted for the purpose hereinbefore set forth, and one which will fully meet the needs.

The ring 3 is provided with an enlargement to limit the downward movement of the arm 19. This enlargement 20 is provided with a cutting edge 21 adapted to bite into the pipe, thus providing means to hold the pipe hook securely in position as the pipe is being lowered.

The invention having been set forth, what is claimed as new and useful is:—

1. In combination, a substantially semicircular ring constituting a body, and provided with a laterally projecting shank, a loop pivoted to the extremity of the shank to which a rope is attached, an additional loop pivoted substantially midway between the extremity of the shank and the ring, a second rope connected to the additional loop, by which the ring may be hoisted, the first rope constituting means for steadying the ring and holding the same substantially horizontal while being hoisted.

2. In combination, a substantially semicircular ring constituting the body of a pipe hook, said ring having a laterally projecting shank, a loop pivoted to the extremity of the shank to which a rope is attached, an additional loop pivoted substantially midway between the extremity of the shank and the ring, a second rope connected to the additional loop, thus constituting means for hoisting the pipe hook, the first rope constituting means for steadying the pipe hook and holding the same substantially horizontal while being hoisted, said ring having an enlargement provided with a cutting edge to bite into the pipe, thus constituting means for anchoring the pipe hook securely to the pipe, said additional loop having a laterally projecting arm constituting means for holding the pipe hook on the pipe, the enlargement acting as means for limiting the downward movement of the arm.

In testimony whereof I have signed my name to this specification in the presence of two subscribing witnesses.

FRANK J. LILAK.

Witnesses:
J. T. JONDA,
A. D. JELLISON.

---

Copies of this patent may be obtained for five cents each, by addressing the "Commissioner of Patents, Washington, D. C."